US008636500B2

(12) United States Patent
Kloosterman et al.

(10) Patent No.: US 8,636,500 B2
(45) Date of Patent: Jan. 28, 2014

(54) TRANSIENT OPERATION OF OXY/FUEL COMBUSTION SYSTEM

(75) Inventors: Jeffrey William Kloosterman, Allentown, PA (US); Vincent White, Surrey (GB)

(73) Assignee: Air Products and Chemicals, Inc., Allentown, PA (US)

( * ) Notice: Subject to any disclaimer, the term of this patent is extended or adjusted under 35 U.S.C. 154(b) by 1524 days.

(21) Appl. No.: 12/238,713

(22) Filed: Sep. 26, 2008

(65) Prior Publication Data
US 2010/0081099 A1    Apr. 1, 2010

(51) Int. Cl.
| F23N 5/20 | (2006.01) |
| F23N 5/22 | (2006.01) |
| F23M 3/00 | (2006.01) |
| F23D 11/44 | (2006.01) |
| F23L 15/00 | (2006.01) |

(52) U.S. Cl.
USPC ................... 431/6; 431/11; 431/9

(58) Field of Classification Search
USPC ............ 431/9, 284, 129, 354, 352, 350, 351; 137/377, 343
See application file for complete search history.

(56) References Cited

U.S. PATENT DOCUMENTS

| 4,145,885 | A | * | 3/1979 | Solell | 60/504 |
| 4,434,375 | A | * | 2/1984 | Taylor | 290/53 |
| 4,598,547 | A | * | 7/1986 | Danihel | 60/507 |
| 4,604,961 | A | * | 8/1986 | Ortloff et al. | 114/230.12 |
| 4,694,944 | A | * | 9/1987 | Schmidt | 192/56.5 |
| 4,754,157 | A | * | 6/1988 | Windle | 290/53 |
| 5,944,448 | A | * | 8/1999 | Williams | 405/169 |
| 6,314,896 | B1 | | 11/2001 | Marin | |
| 6,449,851 | B1 | * | 9/2002 | Bone et al. | 30/372 |
| 6,619,041 | B2 | | 9/2003 | Marin | |
| 6,935,251 | B2 | | 8/2005 | Marin | |
| 7,185,595 | B2 | | 3/2007 | D'Agostini | |
| 7,303,606 | B2 | * | 12/2007 | Zeng et al. | 95/114 |
| 8,143,321 | B2 | | 3/2012 | Burdeniuc et al. | |
| 2003/0079665 | A1 | * | 5/2003 | Atreya | 110/345 |
| 2004/0231332 | A1 | | 11/2004 | Saucedo | |

(Continued)

FOREIGN PATENT DOCUMENTS

| EP | 1 959 193 A1 | 8/2008 |
| EP | 2 110 604 A2 | 10/2009 |

(Continued)

OTHER PUBLICATIONS

Kevin Boyle Fogash, Combustion System With Steam or Water Injection, U.S. Appl. No. 12/238,632, filed Sep. 26, 2008.

(Continued)

*Primary Examiner* — Thomas Denion
*Assistant Examiner* — Brian Inacay
(74) *Attorney, Agent, or Firm* — Michael K. Boyer; Larry S. Zelson (57) ABSTRACT

According to an embodiment, a method of operating an oxy/fuel system and an oxy/fuel system circulate a support gas in the combustion system prior to activating at least one burner, produce the combustion fluid including $CO_2$, wherein a level of the $CO_2$ in the combustion fluid increases as a function of time, and continue production of the combustion fluid to exceed a predetermined level of the $CO_2$ in the combustion fluid, for a period of time, the predetermined level being sufficient to permit the $CO_2$ to be purified by a $CO_2$ purification unit.

18 Claims, 9 Drawing Sheets

(56) References Cited

U.S. PATENT DOCUMENTS

| | | | |
|---|---|---|---|
| 2005/0178637 A1* | 8/2005 | Tsuchiya et al. | 192/105 CD |
| 2005/0233274 A1* | 10/2005 | Marin et al. | 431/116 |
| 2006/0040225 A1* | 2/2006 | Garay et al. | 431/114 |
| 2006/0129020 A1 | 6/2006 | Barends | |
| 2007/0122328 A1* | 5/2007 | Allam et al. | 423/235 |
| 2008/0044782 A1* | 2/2008 | Kostlin et al. | 431/284 |
| 2008/0173584 A1 | 7/2008 | White et al. | |
| 2008/0173585 A1 | 7/2008 | White et al. | |
| 2008/0176174 A1 | 7/2008 | White et al. | |

FOREIGN PATENT DOCUMENTS

| | | |
|---|---|---|
| FR | 2 853 265 A1 | 10/2004 |
| FR | 2 872 566 A1 | 1/2006 |
| FR | 2 891 609 A1 | 4/2007 |
| WO | 2004083726 | 9/2004 |

OTHER PUBLICATIONS

Aleksandar Georgi Slavejkov, Combustion System With Precombustor, U.S. Appl. No. 12/238,644, filed Sep. 26, 2008.

Mark Daniel D'Agostini, Oxy/Fuel Combustion System With Minimized Flue Gas Recirculation, U.S. Appl. No. 12/238,657, filed Sep. 26, 2008.

Reed Jacob Hendershot, Convective Section Combustion, U.S. Appl. No. 12/238,671, filed Sep. 26, 2008.

Reed Jacob Hendershot, Oxy/Fuel Combustion System Having Combined Convective Section and Radiant Section, U.S. Appl. No. 12/238,695, filed Sep. 26, 2008.

Mark Daniel D'Agostini, Process Temperature Control in Oxy/Fuel Combustion System, U.S. Appl. No. 12/238,731, filed Sep. 26, 2008.

Mark Daniel D'Agostini, Oxygen Control System for Oxygen Enhanced Combustion of Solid Fuels, U.S. Appl. No. 12/138,755, filed Jun. 13, 2008.

Mark Daniel D'Agostini, Oxy/Fuel Combustion System With Little or No Excess Oxygen, U.S. Appl. No. 12/238,612, filed Sep. 26, 2008.

Mark Daniel D'Agostini, Combustion System With Precombustor, U.S. Appl. No. 61/100,372, filed Sep. 26, 2008.

Mark Daniel D'Agostini, Combustion System With Precombustor for Recycled Flue Gas, U.S. Appl. No. 12/566,819, filed Sep. 25, 2009.

\* cited by examiner

TRANSIENT OPERATION OF OXY/FUEL COMBUSTION SYSTEM

FIELD OF THE DISCLOSURE

The present disclosure is directed to capturing $CO_2$ in an Oxy/Coal combustion system. In particular, the present disclosure is directed to increasing or maintaining a level of $CO_2$ during start up, shut down, and/or trip events of an oxy/coal combustion system at or above a predetermined level.

BACKGROUND OF THE DISCLOSURE

A known oxy/coal combustion system includes a furnace (or radiant section) arranged and disposed to receive a fuel and oxidant to form a combustion fluid, a convective section arranged and disposed to receive the combustion fluid, and one or more heat exchangers arranged and disposed to transfer heat from the combustion fluid to a heat exchange medium. In steady operation, the known oxy/coal combustion system extracts energy by harnessing the heat in the heat exchange medium.

The known oxy/coal combustion system may be subject to start-up conditions, by way of example only, upon first being constructed, subsequent to being shut down for maintenance, or subsequent to a trip event. The known combustion system may be subject to shut down conditions, by way of example only, prior to scheduled maintenance, in response to a trip event, in response to a decreased availability of fuel, or in response to operational limitations. The known combustion system may be subject to a trip event, by way of example only, upon operational problems such as turbine trip events, in response to forced or induced draft fan trip events, in response to mill issues, in response to a loss of flame conditions, or in response to over-pressuring of one or more sections of the combustion system.

As is well known in the art, combustion of carbonaceous fuels results in of $CO_2$. The emission of $CO_2$ occurs during steady operation, start-up, shut-down, and trip events.

Several known technologies for $CO_2$ capture exist. These known technologies focus on post combustion and/or precombustion $CO_2$ capture. For example, at low concentrations or partial pressures, chemical solvents may be used to scrub flue gas. Use of chemical solvents results in energy loss required to regenerate the lean solvent to obtain a high $CO_2$ capture levels. Alternatively, $CO_2$ can be captured prior to combustion utilizing physical sorbents from a integrated gasification combined cycle, IGCC, plant design. This design requires high purity, high pressure oxygen and generates hydrogen gas which is subsequently burned in a gas turbine to produce power. High levels of substantially pure $CO_2$ require non-standard designs for the physical solvent system. A third option is to use lower purity, lower pressure oxygen as the oxidant to combust in a standard utility boiler arrangement. The flue gas from the oxygen-fired option is depleted in nitrogen thus increasing the $CO_2$ partial pressure. The gas can then be cooled, water condensed, and purified to produce a $CO_2$ product.

In known oxy/fuel combustion systems, during start-up, shut-down, and trip events, $CO_2$ is not able to be adequately captured and purified because $CO_2$ levels remain lower than the predetermined level for a longer than desired period.

Therefore, there is an unmet need to provide a method, system, and apparatus improving $CO_2$ capture by increasing and/or maintaining level of $CO_2$ in oxy/fuel combustion systems during start-up, shut-down, and/or trip events.

SUMMARY OF THE DISCLOSURE

This disclosure provides for improving $CO_2$ capture from oxy/fuel combustion by increasing and/or maintaining a level of $CO_2$ in combustion systems during start-up, shut-down, and/or trip events.

According to an embodiment, a method of operating an oxy/fuel combustion system includes providing a combustion system, circulating a support gas in the combustion system prior to activating at least one burner, producing the combustion fluid including $CO_2$, wherein a level of the $CO_2$ in the combustion fluid increases as a function of time, and continuing production of the combustion fluid to exceed a predetermined level of the $CO_2$ in the combustion fluid, for a period of time, the predetermined level being sufficient to permit the $CO_2$ to be purified by a $CO_2$ purification unit. In the embodiment, the combustion system includes a furnace arranged and disposed to receive and combust a fuel to form a combustion fluid, a convective section arranged to receive the combustion fluid from the furnace, and one or more heat exchangers in the convective section arranged and disposed to transfer heat from the combustion fluid to a heat exchange medium.

According to another embodiment, an oxy/fuel system includes a furnace arranged and disposed to receive and combust a fuel to form a combustion fluid, a convective section arranged to receive the combustion fluid from the furnace, one or more heat exchangers in the convective section arranged and disposed to transfer heat from the combustion fluid to a heat exchange medium, and a $CO_2$ purification unit arranged and disposed to purify $CO_2$ above a predetermined level of the $CO_2$. In the embodiment, the furnace is arranged to circulate a primer fluid prior to activating at least burner, the primer fluid being selected from the group consisting of substantially pure $O_2$, substantially pure $CO_2$, and combinations thereof. The combustion fluid includes $CO_2$, wherein the level of the $CO_2$ increases as a function of time. The system is arranged and disposed for continuing to produce the combustion fluid above the predetermined level of the $CO_2$ in the combustion fluid, for a period of time, the predetermined level being sufficient to permit the $CO_2$ to be purified by a $CO_2$ purification unit.

According to another embodiment, a method of operating an oxy/fuel combustion system includes providing an oxy/fuel combustion system, deactivating one or more of at least one burner, circulating a primer fluid in the combustion system subsequent to deactivating the one or more of the at least one burner, and maintaining a level of $CO_2$ in the combustion fluid above a predetermined level of the $CO_2$, for a period of time, the predetermined level being sufficient to permit the $CO_2$ to be purified by a $CO_2$ purification unit, wherein the level of the $CO_2$ decreases as a function of time. In the embodiment, the combustion system includes the at least one burner, a furnace arranged and disposed to receive and combust a fuel to form a combustion fluid, a convective section arranged to receive the combustion fluid from the furnace, and one or more heat exchangers in the convective section arranged and disposed to transfer heat from the combustion fluid to a heat exchange medium.

An advantage of the present disclosure is increasing the level of $CO_2$ in a combustion system during start-up thereby permitting capture and/or purification of $CO_2$.

Another advantage of the present disclosure is capturing more $CO_2$ thereby resulting in fewer $CO_2$ emissions of non-captured $CO_2$.

Yet another advantage of the present disclosure is capturing and/or purifying $CO_2$ during start-up, shut-down, and trip events.

An advantage of the present disclosure is maintaining the level of $CO_2$ above a predetermined level in a combustion system during shut-down and trip events.

Still yet another advantage of the present disclosure is maintaining $CO_2$ levels above a predetermined level during trip events.

Still yet another advantage of the present disclosure is a simpler design of oxy-fuel fired facility not requiring air handling equipment and ducting.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

Wherever possible, the same reference numbers will be used throughout the drawings to represent the same parts.

DETAILED DESCRIPTION OF THE DISCLOSURE

The present disclosure now will be described more fully hereinafter with reference to the accompanying drawings, in which a preferred embodiment of the disclosure is shown. This disclosure may, however, be embodied in many different forms and should not be construed as limited to the embodiments set forth herein; rather, these embodiments are provided so that this disclosure will be thorough and complete and will fully convey the scope of the disclosure to those skilled in the art.

As used herein, the term "solid fuel" refers to any solid fuel suitable for combustion purposes. For example, the disclosure may be used with many types of solid fuels, including but not limited to: anthracite, bituminous, sub-bituminous, and lignite coals; tar; bitumen; petroleum coke; paper mill sludge solids and sewage sludge solids; wood; peat; grass; and combinations and mixtures of all of those fuels. As used herein, the term "oxygen" refers to an oxidizer with an $O_2$ concentration greater than ambient or atmospheric conditions. As used herein, the term combustion fluid refers to a fluid resulting from combustion of fuels, which may be utilized for convective heat transfer. The term includes at least some products of combustion and may further include fluids mixed with combustion fluids and otherwise traveling through at least a portion of combustion system.

Figure 1:
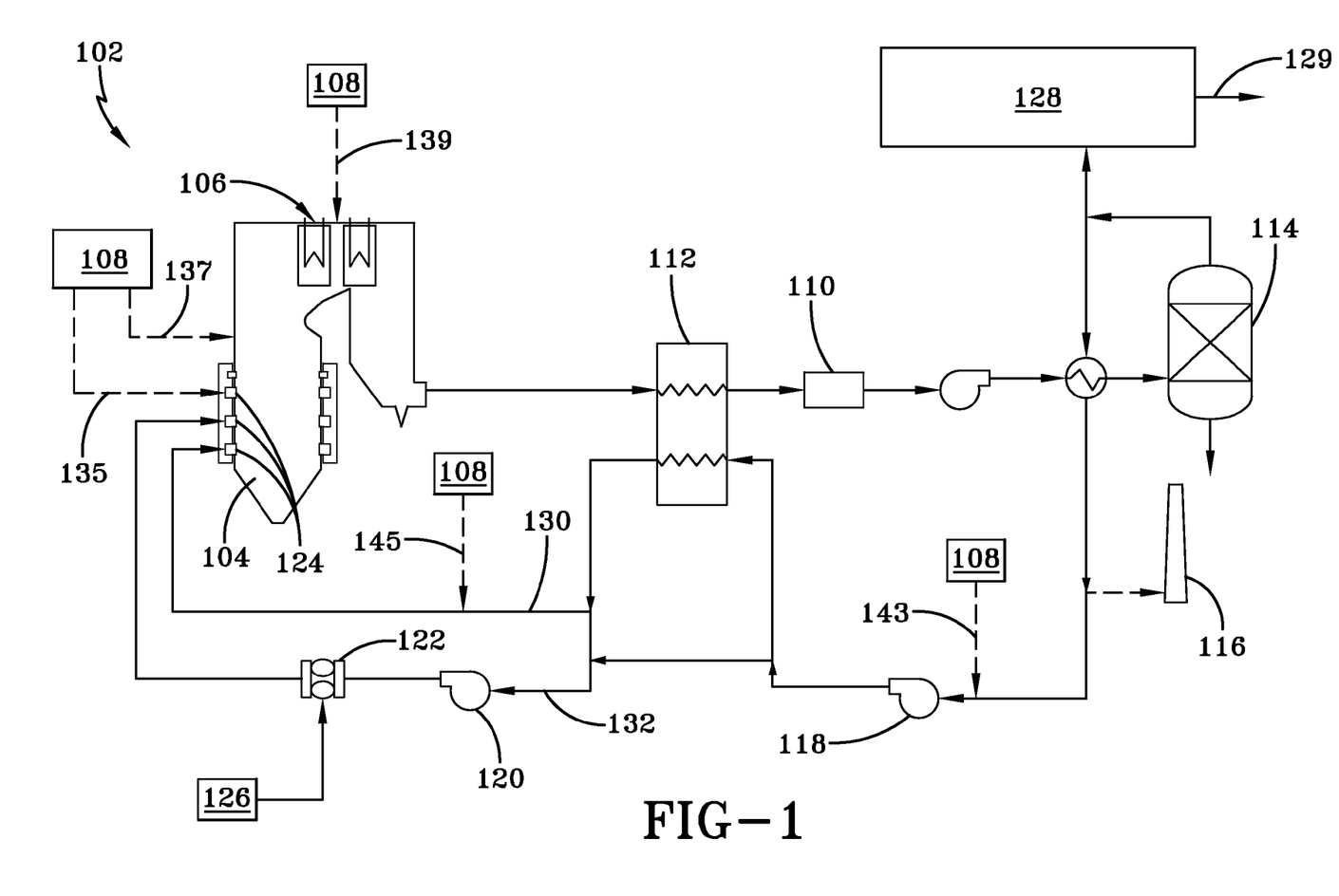
FIG. 1 illustrates a schematic view of an exemplary embodiment of a combustion system.

FIG. 1 illustrates a schematic illustration of an exemplary embodiment of a combustion system 102 according to the present disclosure. Specifically, FIG. 1 depicts combustion system 102 as an oxygen-fired coal plant. Referring to FIG. 1, combustion system 102 includes a furnace 104 and a convective section 106. Furnace 104 receives and combusts pulverized coal with oxygen to generate heat and a concomitant flue gas. While the disclosure has been described with respect to pulverized coal, other solid fuels may be utilized. The combustion fluid from furnace 104 provides additional heat to convective section 106. Convective section 106 includes a plurality of heat exchangers that remove heat from the combustion fluid formed in furnace 104 (see also FIG. 2). The heat is utilized to produce and superheat steam for use in generators or other steam load sources. Within convective section 106, as is understood in the art, primary superheating and reheating may be followed by an economizer for final preheating of boiler feed water. It is desirable that sufficient mass flow exists within the combustion fluid to provide proper heat transfer via both radiation and convection. Furthermore, the temperature distribution within the combustion fluid may match the designed heat transfer surface area to allow full utilization of the surface area and proper heating within the steam generation circuit.

In contrast to known air-fired coal systems, the oxygen fired coal systems may provide a higher temperature in furnace 104 and lower mass flow rate for the combustion fluid. Controlled amounts of recycled flue gas may be used to assist in providing desired flame characteristics and/or temperature. While not required for mass flow, the recycled flue gas may be utilized to increase the mass flow of the combustion fluid to provide increased heat transfer in convective section 106.

The exemplary embodiment illustrated by FIG. 1 further includes an electrostatic precipitator 110 configured to permit the combustion fluid, upon exiting a support gas preheater 112, to undergo dust removal followed by an optional flue gas desulfurization unit 114 where $SO_2$ is removed. In certain embodiments of the present disclosure, the combustion fluid exiting flue gas desulfurization unit 114 is recycled as recycled flue gas to furnace 104. The recycled flue gas may be utilized to assist in providing desired flame characteristics and/or temperature. While not required for mass flow, the recycled flue gas may be utilized to increase the mass flow of the combustion fluid to provide increased heat transfer in convective section 106. The remainder of the combustion fluid exiting desulfurization unit 114 is sent to $CO_2$ purification unit 128. $CO_2$ purification unit 128 may utilize any known $CO_2$ purification/compression method compatible with Oxy/Fuel combustion systems and may include known, conventionally available $CO_2$ purification/compression equipment. Examples of known $CO_2$ purification/compression equipment are disclosed in U.S. Patent Application 2008/0176174, filed Jan. 23, 2007 and U.S. Patent Application 2008/0173585, filed Jan. 23, 2007, which are both herein incorporated by reference in their entirety.

Since oxy-fuel combustion is utilized in this system, nitrogen in the flue gas is reduced or eliminated, in contrast to an air-fired combustion system. Thus, most or all of the nitrogen is eliminated from the system resulting in the combustion fluid having a high level of $CO_2$. This enrichment in $CO_2$ permits easier capture of the $CO_2$ for purification and compression after processing through $CO_2$ purification unit 128 producing a $CO_2$ product 129. As further described in U.S. Patent Application 2008/0176174 and U.S. Patent Application 2008/0173585, $CO_2$ product 129 can be used for several purposes.

Combustion system 102 may also permit the combustion fluid from desulfurization unit 114 to exit system 102 via a stack 116 into the atmosphere. As illustrated in FIG. 1, recycled flue gas for recycle to furnace 104 may be supplied by a forced draft fan 118 and preheated by support gas preheater 112. A primary support gas fan 120 utilizes a portion of the recycled flue gas and acts as a carrier of fuel from a fuel pulverizer 122 supplied by fuel source 126 to burners 124. The support gases (which may be primary recycle and/or secondary recycle) are preferably substantially free of nitrogen and/or air. Coal combustion occurs at burners 124, where a stream of secondary support gas 130 may also be supplied. The stream of secondary support gas 130 is similarly supplied by forced draft fan 118 and preheated by support gas preheater 112 prior to being supplied to coal burners 124. It is desirable that burner 124 is arranged and disposed for providing adjustable velocity to maximize conditions during start-up. Such adjustability may include maintaining firing stability while at less than or equal to half the maximum firing rate of burner 124. An example of a burner capable of achieving these conditions is disclosed in U.S. Pat. No. 7,185,595, filed Aug. 30, 2002, which is herein incorporated by reference in its entirety.

Oxygen may be utilized as the support gas, wherein the oxygen is added to or replaces the recycled flue gas. The oxygen may be added from any suitable source. Suitable oxygen sources may comprise a system including cryogenic separation of air to produce oxygen (in various purities) and other by-products (typically, nitrogen and argon). The product oxygen from the oxygen source can be either gaseous or liquid in form. Alternatively, oxygen can be generated via a pressure swing/vacuum swing operation over adsorbent beds. Other processes, such as membrane-based systems, including ion transport membranes, can also produce an oxygen predominant stream. Likewise, the oxygen may be added at any suitable location in system 102, including into primary support gas 132, secondary support gas 130, burner 124, furnace 104 or any other location that supports combustion of the solid fuel.

As illustrated in FIG. 1, the stream of secondary support gas 130 may be supplied to primary support gas 132 at varying points. This increased flexibility of the injection of the secondary support gas 130 provides a means of controlling the temperature of the primary and recycle independently and provides the ability to include a bypass of the preheater for the primary support gas 132. Additionally, in some embodiments, secondary support gas 130 may pass separately through preheater 112.

Figure 2:
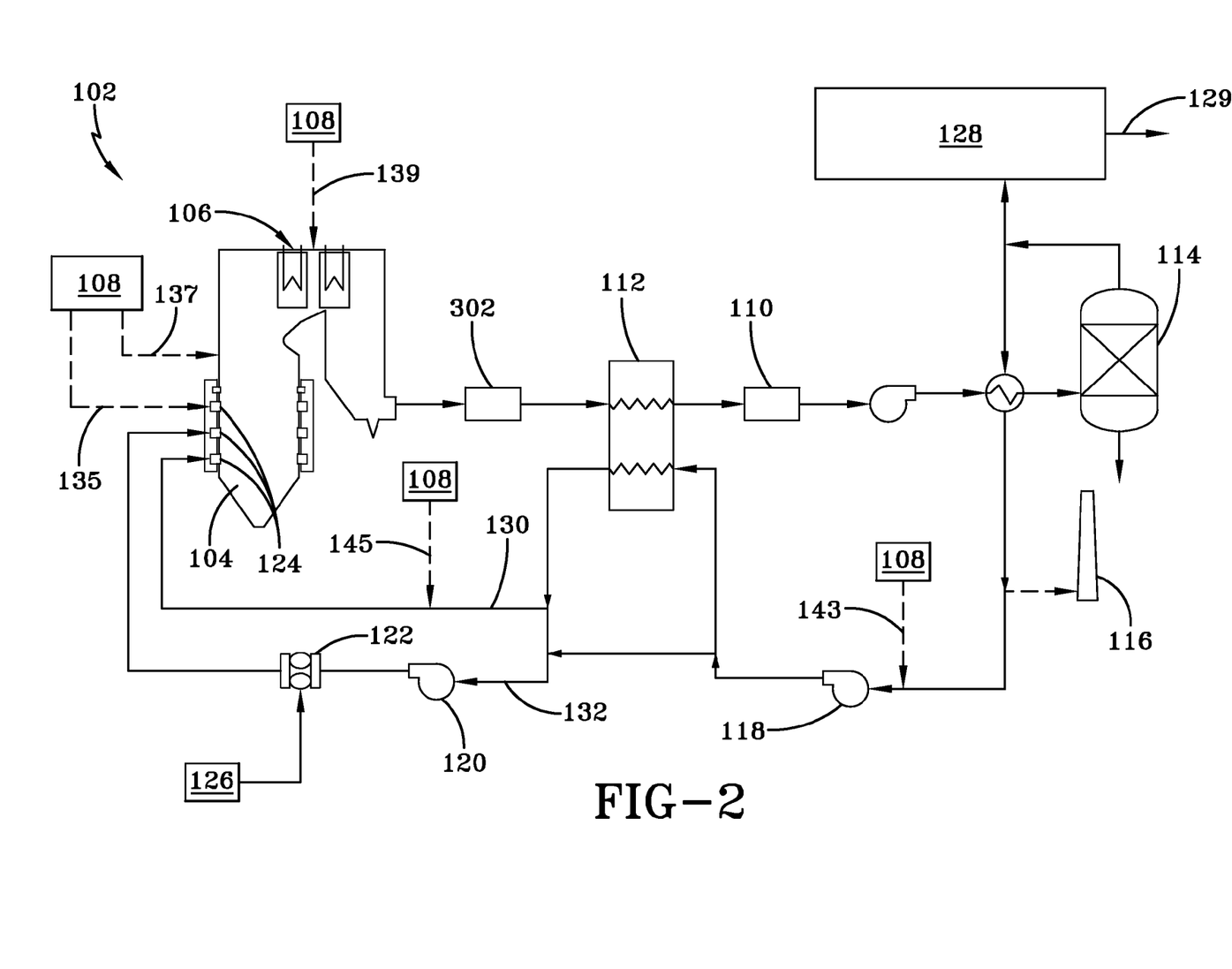
FIG. 2 illustrates a schematic view of another exemplary embodiment of the combustion system.

FIG. 2 includes an arrangement of combustion system 102 substantially identical to the arrangement shown in FIG. 1. In FIG. 2, however, upon completing travel through convective section 106, the flue gas undergoes $DeNO_x$ in a selective catalytic reduction unit 302 followed by cooling with support gas preheater 112 (such as a preferred Lungstrom type rotary unit). In the embodiment illustrated by FIG. 1, the $DeNO_x$ selective catalytic reduction unit 302 may be omitted for several reasons. These reasons include, but are not limited to, the use of substantially nitrogen-free $CO_2$ or $O_2$ in combustion system 102 thereby reducing $NO_x$ and/or because $NO_x$ will not be released to the atmosphere, rather the $NO_x$ will remain with the $CO_2$ going to $CO_2$ purification unit 128.

Combustion system 102 may be subject to transient conditions deviating from steady-state operation. These conditions include start-up conditions, shut-down conditions, and trip events (which include hot starts where the combustion system remains at a temperature above ambient temperature and is ultimately brought back up to steady-state operation). As do steady-state operations, transient conditions result in emission of $CO_2$. Technology, such as $CO_2$ purification unit 128, requires the level of $CO_2$ to be above a predetermined level in order to result in $CO_2$ product 129. The predetermined level is based upon the requirements of the specific purification unit included in the system. Certain purification units require a higher level of $CO_2$ than other units. Thus, although a specific level may be used for the exemplary purposes in this disclosure, this disclosure is, in part, directed to the control of the $CO_2$ level.

As is well known in the art, igniters may be used to bring combustion system 102 to the desired temperature. Generally, igniters are activated into combustion systems to slowly warm the combustion system. Igniters are usually fed with a separate, support fuel. When the combustion system reaches a desired temperature sufficient to maintain combustion of the primary fuel, primary fuel is introduced and combustion occurs (in the present disclosure a solid fuel). Upon achieving stable combustion, the igniters may be deactivated.

Figure 3:
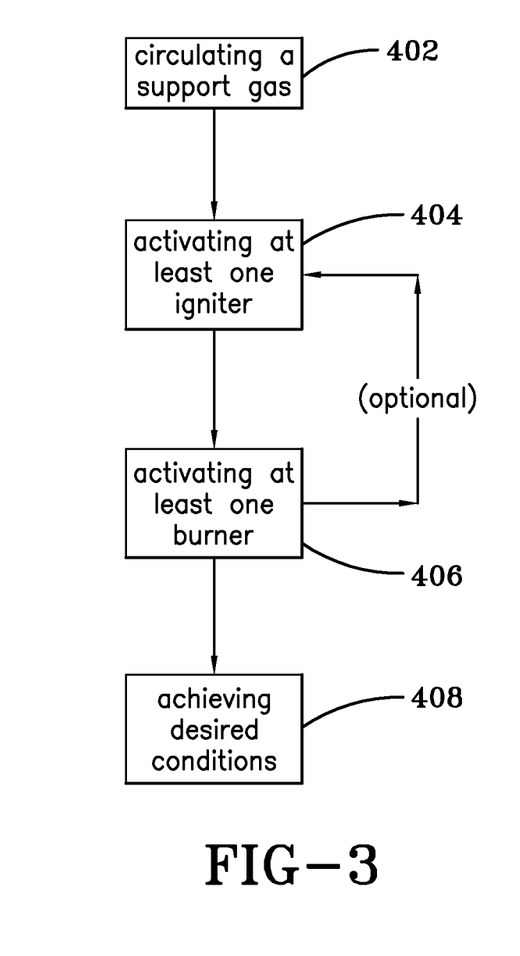
FIG. 3 illustrates a diagrammatic representation of a method of achieving a desired conditions in a combustion system.
Figure 4:
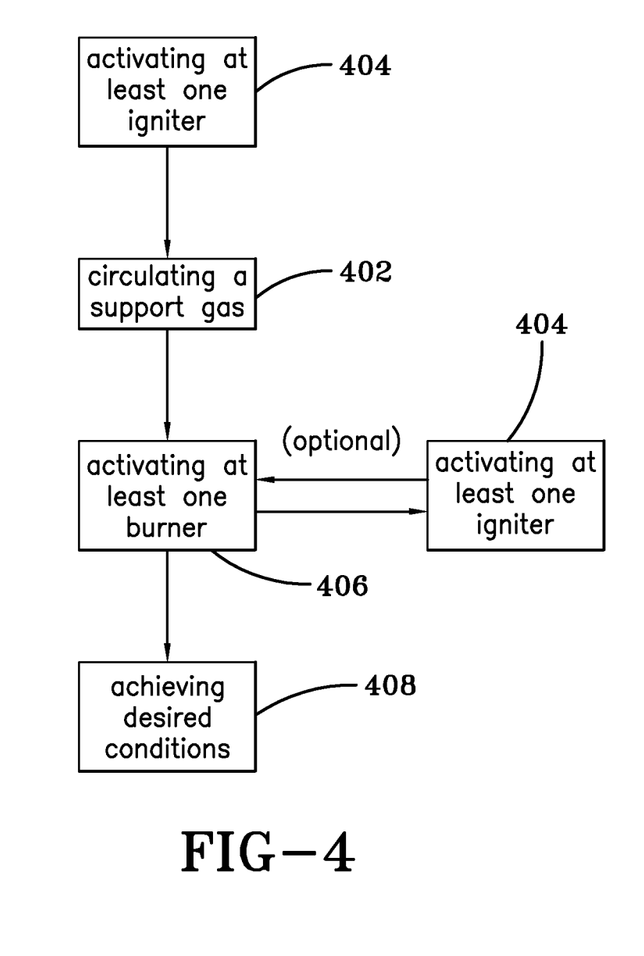
FIG. 4 illustrates a diagrammatic representation of a method of achieving a desired conditions in a combustion system.
Figure 5:
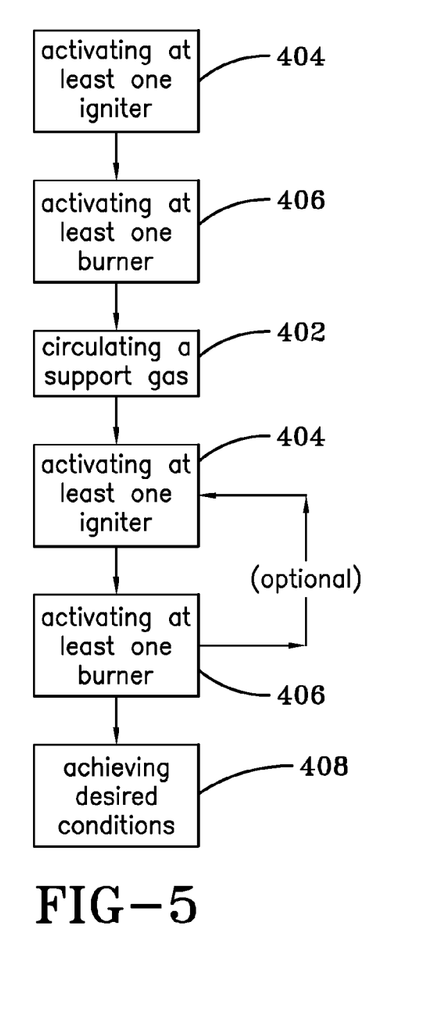
FIG. 5 illustrates a diagrammatic representation of a method of achieving a desired conditions in a combustion system.

FIGS. 3, 4, and 5 diagrammatically illustrate exemplary embodiments of starting a combustion system according to the disclosure. As mentioned above, the disclosed method is, in part, intended to meet the predetermined level of $CO_2$ during, for example, start-up, shut-down, and transient conditions. As illustrated in FIGS. 3, 4, and 5, the method includes circulating a support gas prior to activating burner 124, a plurality of burners, or a grouping of burners. For example, the support gas may be an externally supplied primer fluid such as substantially pure $O_2$, substantially pure $CO_2$, substantially pure $O_2$ mixed with substantially pure $CO_2$, or other fluids facilitating $CO_2$ capture and purification, such as recycled flue gas, including the initial charge of air in the system before combustion commences.

By activating burner 124, the plurality of burners, or the grouping of burners subsequent to support gas being circulated, the temperature of combustion system 102 increases in a steadier manner. Burners 124 and/or igniters may be activated based upon prior calculations or based upon information gathered through sensors, such as temperature sensors (for example, thermocouples), incorporated throughout combustion system 102. By activating or deactivating igniters in a step-wise process, heating or cooling combustion system 102 to a desired temperature is gradual. This gradual heating or cooling of combustion system 102 will prolong the usable life of portions of combustion system 102. Additionally, by using an externally supplied primer fluid such as substantially pure $CO_2$, substantially pure $O_2$, or combinations thereof as the support gas, the heating or cooling of combustion system 102 results in reaching the predetermined level of $CO_2$ required for capturing and purifying more $CO_2$ remaining above the predetermined level for capturing and purifying more $CO_2$. For instance, as illustrated in the Examples below, if the predetermined mole fraction level of the $CO_2$ is about 0.5, under one embodiment, it may be achieved at about 0.7 of the total time to achieve full-firing conditions. As will be appreciated, the predetermined level of $CO_2$ changes based upon the size of combustion system 102 and/or the method of operation.

Referring to FIG. 3, an exemplary embodiment of the disclosure includes the step of beginning circulation of support gas 402 prior to the step of activating at least one igniter 404. As further illustrated in FIG. 3, the step of activating at least one igniter 404 is followed by the step of activating at least one burner 406. Optionally, the step of activating at least one igniter 404 and the step of activating at least one burner 406 may be repeated. Such repetition is desired to further make the increase in temperature of combustion system 102 a gradual transition over time; however, it is not desirable for such repetition to unnecessarily prolong the duration of time before desired conditions are achieved, desired conditions may included, but not be limited to, achieving full-firing. The final step illustrated in FIG. 3 includes the step of achieving desired conditions 408.

Referring to FIG. 4, another embodiment of the disclosure includes the step of activating at least one igniter 404 prior to the step of beginning circulation of support gas 402. In this embodiment, the step of beginning circulation of support gas 402 is followed by the step of activating at least one burner 406. Optionally, the step of activating at least one igniter 404 and the step of activating at least one burner 406 may be repeated. Such repetition is desired to further make the increase in temperature of combustion system 102 a gradual transition over time; however, it is not desirable for such repetition to unnecessarily prolong the duration of time before desired conditions are achieved, desired conditions may included, but not be limited to, achieving full-firing. The final step illustrated in FIG. 4 includes the step of achieving desired conditions 408.

Referring to FIG. 5, yet another embodiment of the disclosure includes the step of activating at least one igniter 404 prior to the step of activating at least one burner 406, which precedes the step of beginning circulation of support gas 402. In this embodiment, the step of beginning circulation of support gas 402 is followed by the step of activating at least one igniter 404, which is followed by the step of activating at least one burner 406. Optionally, the step of activating at least one igniter 404 and the step of activating at least one burner 406 may be repeated. Such repetition is desired to further make the increase in temperature of combustion system 102 a gradual transition over time; however, it is not desirable for such repetition to unnecessarily prolong the duration of time before desired conditions are achieved, desired conditions may included, but not be limited to, achieving full-firing. The final step illustrated in FIG. 5 includes the step of achieving desired conditions 408. As will be appreciated, the steps associated with FIGS. 3, 4, and 5 may be repeated or rearranged as is consistent with the disclosure.

In addition, the presently disclosed methods of start-up may be used following a trip event requiring a hot start.

Figure 6:
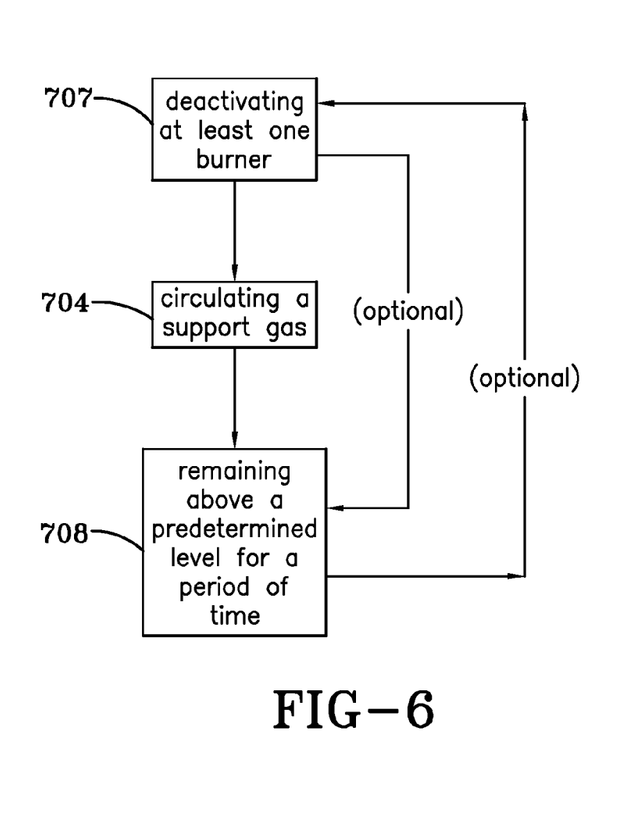
FIG. 6 illustrates a diagrammatic representation of a method of maintaining $CO_2$ level during shut-down and/or trip events.

Referring to FIG. 6, an exemplary embodiment of the disclosure includes the step of deactivating at least one burner 702, the step of circulating support gas in the combustion system subsequent to deactivating the at least one burners 704 while still producing fluid including $CO_2$, wherein the level of the $CO_2$ decreases as a function of time, and the step of remaining above a predetermined level of the $CO_2$ 708, the predetermined level permitting the $CO_2$ to be captured and purified by a $CO_2$ purification unit. In one embodiment, air is purged while the system 102 is hot (or above ambient temperature). In another embodiment, recycled primary flue gas recycle reduces the rate at which air is used to purge the system whereby the air purge rate is at a ratio of greater than zero and less than or equal to the recycle flue gas flow rate.

EXAMPLES

For each of the following examples, a typical wall-fired utility boiler was chosen for comparison to the embodiments of the disclosure. The first example centers on start up of a utility burner on air-fuel firing prior to full firing followed by recycle of gas and introduction of oxygen as the oxidant. The second example demonstrates conditions in which oxygen, and therefore recycle, is implemented at the start of the system warming. The third example demonstrates conditions in which $CO_2$ from an external source is used as the recycled gas stream.

FIGS. 7 through 11 illustrate the level of $CO_2$ as a mole fraction for combustion fluid, which includes the support gas if being circulated, over a period of dimensionless time. FIGS. 7 through 11 specify the mole fraction for a $CO_2$ component 801, an $H_2O$ component 803, an $N_2$ component 805, and an $O_2$ component 807. The illustrations of these components are merely exemplary and not intended as a limitation on the components that may comprise combustion fluid and/or support gas. Corresponding with Table 3, FIGS. 7 through 9 further illustrate the start-up method by expressing an exemplary process including a step of activating a first set of igniters at dimensionless time 0.0, a step of activating a second set of igniters 809, a step of activating a third set of igniters 811, a step of activating a fourth set of igniters 813, a step of activating a first set of burners 815, a step of activating a second set of burners while removing or deactivating the first set of igniters 817, a step of activating a third set of burners while removing or deactivating the second set of igniters 819, a step of activating a fourth set of burners while removing or deactivating the third set of igniters 821, and a step of achieving full firing while removing or deactivating the fourth set of igniters 823.

Table 1 details the fuel used in each of the first three examples. Table 2 tabulates the various system parameters used to conduct the simulations. The start up cycle was kept constant and is shown in Table 3. Dimensionless time is used as the basis for the simulation as start-up procedures vary from system to system. A dimensionless time of 1.0 represents when the system is considered at full-firing rates with no igniters necessary to support combustion. The minimum recycle fan capacity was limited to 40% in all three examples. For purposes of comparison, the minimum mole fraction of $CO_2$ in the flue gas for downstream capture and processing was maintained at 0.50.

TABLE 1

Coal Analysis
Coal Characteristics for a Typical High Volatile Bituminous Coal[+]

| Proximate Analysis, wgt % | $H_2O$ | 2.5 |
|---|---|---|
| | Volatile Matter | 37.6 |
| | Fixed Carbon | 52.9 |
| | Ash | 7 |
| Ultimate Analysis, wgt % | $H_2O$ | 2.5 |
| | C | 75 |
| | H | 5 |
| | S | 2.3 |
| | O | 6.7 |
| | N | 1.5 |
| HHV, BTU/lb | | 13000 |

TABLE 2

Boiler Design Parameters

| Descriptor | Value |
|---|---|
| Unit Output | 600 MWe |
| Configuration | Opposed wall |
| Burners | 32 |
| Rows | 4 |
| Igniter Fuel | Natural Gas |
| Igniter size | 10% burner size |
| Igniter Fuel Value HHV @ 60° F., 14.7 psia | 1000 Btu/ft$^3$ |
| Flue Gas Oxygen wet basis | 4.5% |
| Air inleakage % of flue gas flow | 3.0% |
| Boiler Ramp Rate | 15° F./min |
| Boiler Avg Temp at Full Rates | 1750° F. |
| Avg. Residence Time Vr/Vo | 28 sec |
| Unit efficiency (HHV) | 39% |
| Recycle Ratio (based on purge flow) | 2.0 |
| Min Recycle Flow % of Full | 40.0% |
| Minimum Inerts $CO_2$ mole fraction for removal | 0.50 |

TABLE 3

Start Up Procedure

| Description | Step Time | Dimensionless Cumulative Time | Firing Rate |
|---|---|---|---|
| 1$^{st}$ set of igniters | 0.083 | 0.000 | 0.025 |
| 2$^{nd}$ set of igniters | 0.083 | 0.083 | 0.050 |
| 3$^{rd}$ set of igniters | 0.083 | 0.167 | 0.075 |
| 4$^{th}$ set of igniters | 0.083 | 0.250 | 0.100 |
| 1$^{st}$ set of burners | 0.167 | 0.333 | 0.350 |
| 2$^{nd}$ set of burners | 0.167 | 0.500 | 0.575 |
| Remove 1$^{st}$ set of igniters 3$^{rd}$ set of burners | 0.167 | 0.667 | 0.800 |
| Remove 2$^{nd}$ set of igniters 4$^{th}$ set of burners | 0.167 | 0.833 | 1.025 |
| Remove 3$^{rd}$ set of igniters Full Firing Remove 4$^{th}$ set of igniters | N/A | 1.000 | 1.000 |

Figure 7:
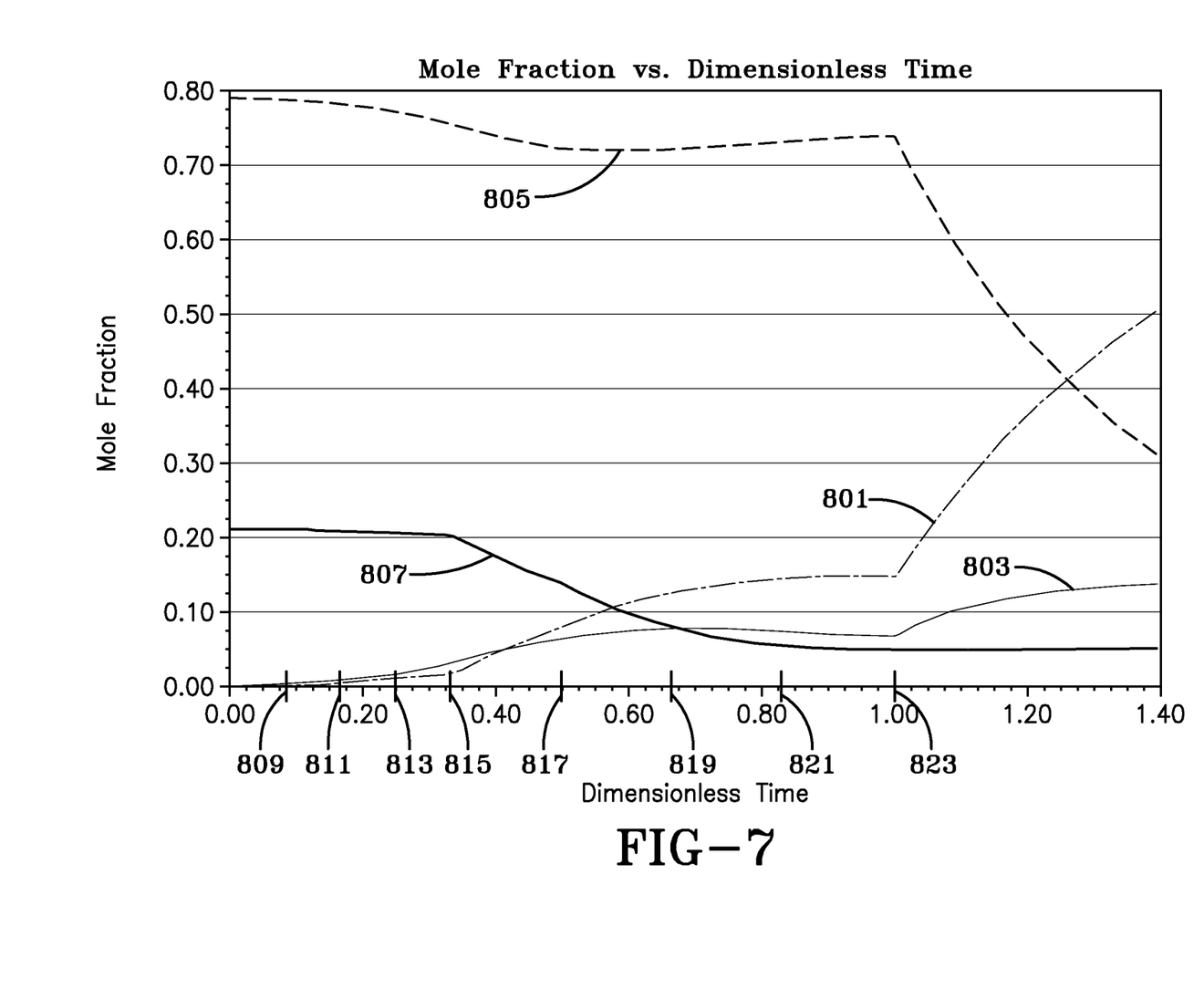
FIG. 7 graphically illustrates the relationship between level of $CO_2$ in the flue gas and time according to an exemplary embodiment of the disclosure.

Example 1 describes the response of a system initially started with air, then transitioned to full oxygen firing with recycle after full firing is reached. The response curve for the system is shown in FIG. 7. In FIG. 7, the dimensionless time of 0.0 represents the igniters being activated prior to the system being brought up with air-fuel firing, which is represented by the dimensionless time of 1.0. As has been well documented, the final composition of the flue gas at full firing rates has less than 15% $CO_2$ in the flue gas. The response of the system to the introduction of support gas circulation is shown at times>1.0. The nitrogen in the system is depleted as $CO_2$ and water fractions increase. Table 4 shows the cumulative emissions for the example compared with examples 2 and 3. The emissions in Table 4 are normalized with example 1 air-fuel startup given as a baseline value of 1.0. Carbon dioxide emissions are tabulated until a mole fraction of 0.50 $CO_2$ is reached. FIG. 7 shows this occurs at a dimensionless time of 1.39. Cumulative carbon dioxide emissions measured in thousand lbmoles were tabulated for this example and are normalized based upon a dimensionless baseline value of 1.0 as documented in Table 4.

Example 2 describes the response of a system which is initially started up on oxygen based firing of the igniters where the recycle of flue gas is started immediately. As stated earlier, the minimum value of recycle fan is set at 40% capacity and the recycle rate is two thirds the exiting flow, defined as a recycle ratio of 2.0. This leaves one third of the flow to be further processed downstream and initially vented. A recycle ratio of 2.0 is achievable at full rates and at modest turndown conditions. However, as the boiler is in deep turndown or starting up, the minimum flow requirements of the recycle fan limit the turndown of the recycle fan. Below this minimum turndown, the recycle flow rate is fixed and the recycle ratio increases with increasing turndown. Until the second set of burners is operational, the recycle rate is fixed at 40% of fan capacity for this example. After this point, the recycle rate is allowed to vary such that the amount of gas recycled to the boiler is twice the amount of purge gas flow, a recycle ratio of 2.0 as mentioned previously.

Figure 8:
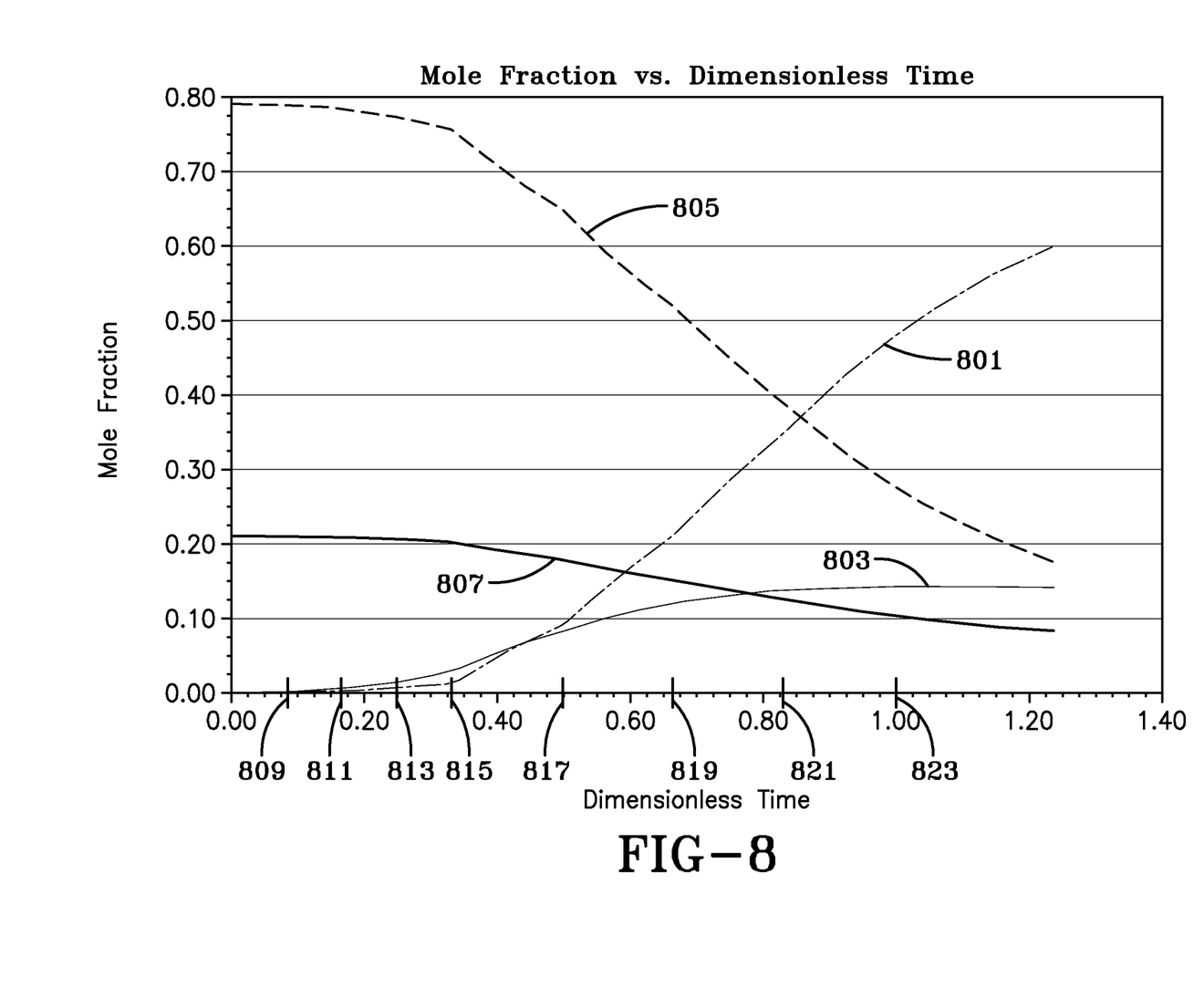
FIG. 8 graphically illustrates the relationship between level of $CO_2$ in the flue gas and time according to an exemplary embodiment of the disclosure.

FIG. 8 shows the response of Example 2 to the various components of the system. As in FIG. 7, the dimensionless time of 0.0 represents the time of activating the first igniter. After an initial slow period of change, the response of the system is more apparent with the introduction of the final igniter and further effected with the introduction of the first set of burners. The $CO_2$ mole fraction in the flue gas reaches 0.50 at a dimensionless time of 1.0. This is under the time required by the Example 1. Table 4 indicates a reduction in total $CO_2$ emissions of about 60% as compared with Example 1 emissions.

Figure 9:
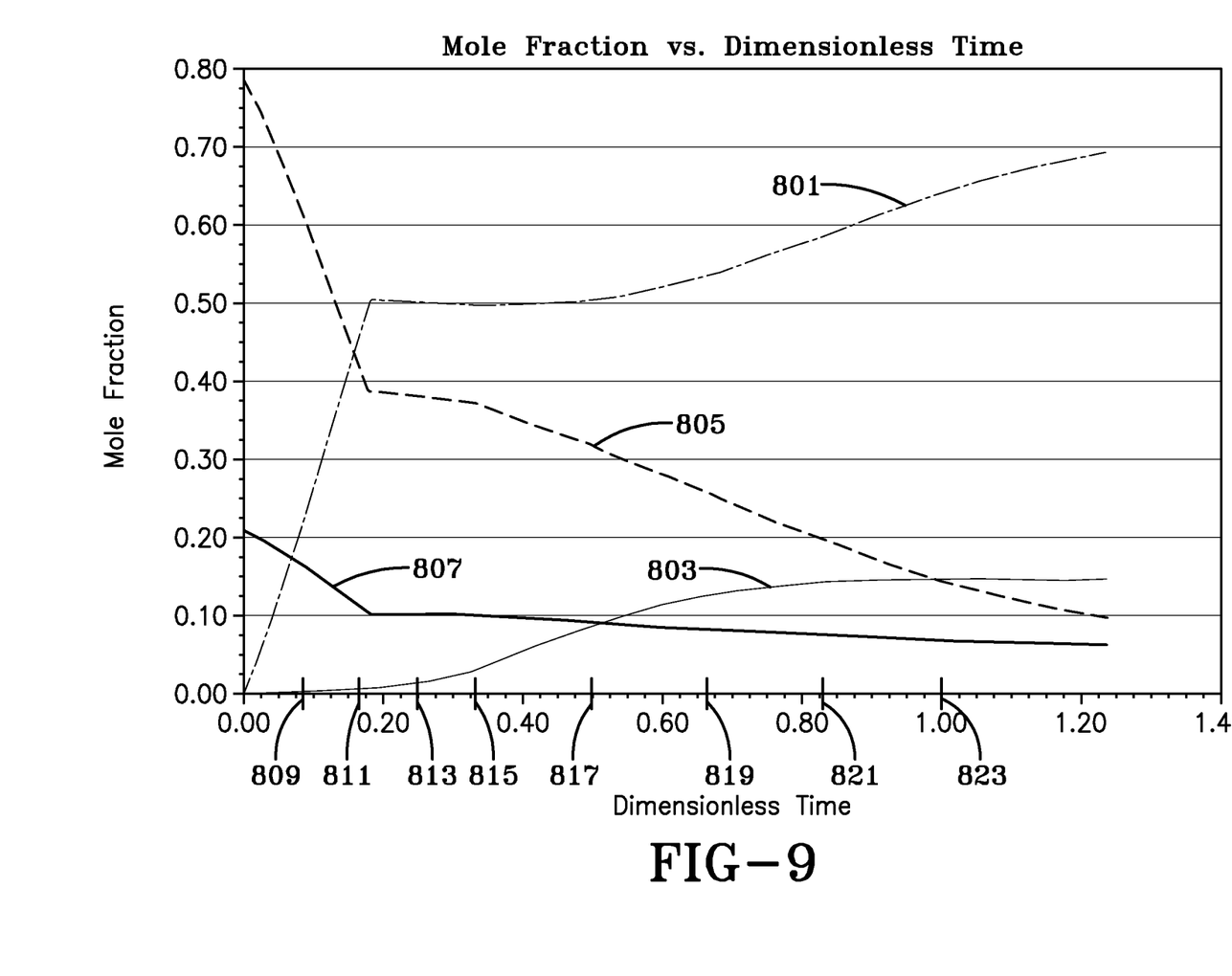
FIG. 9 graphically illustrates the relationship between level of $CO_2$ in the flue gas and time according to an exemplary embodiment of the disclosure.

Example 3 describes the response of a system in which $CO_2$ from an external source is used to supply the initial charge into the recycle loop. The externally provided $CO_2$ is assumed to be of very high purity such that impurities in the stream can be ignored without significant effect to the results. The externally supplied $CO_2$ stream is injected at the minimum recycle capacity until the threshold of 0.5 mole fraction in the flue gas is reached. At that point, the external supply of $CO_2$ is stopped and recycling of the flue gas commences. The recycle rate is adjusted based on the incoming flow rate of combusted gases with a minimum flow rate of 40% of full rates as similarly described in Example 1. The response of the system is shown in FIG. 9, which includes a dimensionless time of 0.0 representing the activation of the first igniter. Clearly, the response of the system to the externally supplied $CO_2$ is much faster than either Examples 1 or 2. The rapid build up of $CO_2$ in the flue gas allows for the $CO_2$ mole fraction to reach 0.5 by 0.18 dimensionless time units. The corresponding reduction in $CO_2$ emissions is shown in Table 4. The relative emissions are curtailed to 18% the original air-fuel emissions and slightly under half the emissions of recycle method in example 2.

TABLE 4

Emissions Results

| | Example 1 | Example 2 | Example 3 |
|---|---|---|---|
| Total $CO_2$ Emissions 10$^3$ lbmoles | 85.8 | 32.5 | 15.3 |
| Relative $CO_2$ Emissions | 1.00 | 0.38 | 0.18 |

The next set of examples describes the response of a combustion system during shutdown. The initial state of the combustion system is document in Table 5 for each of the examples. The atmosphere within the boiler is equivalent to what is expected from oxy-fuel firing on the coal described in Table 1.

TABLE 5

Emissions Results

| | Example 4 | Example 5 | Example 6 | Example 7 |
|---|---|---|---|---|
| Dimensionless Time Mole fraction $CO_2 = 0.50$ | 0.053 | 0.022 | 0.200 | 0.351 |
| Average Boiler Temperature ° F. | 1700 | 1700 | 100 | 100 |
| % $CO_2$ in boiler at start of air purge | 65.3% | 65.3% | 65.3% | 80.0% |
| Total $CO_2$ Captured lbmole | 415.5 | 418.5 | 1642.6 | 2208.9 |
| Total $CO_2$ Emitted lbmole | 173.0 | 171.5 | 646.1 | 594.9 |
| Total lbmole $CO_2$ at start of shutdown | 589.5 | 589.5 | 2288.7 | 2803.8 |
| Relative $CO_2$ Emissions Efficiency Based | 1.00 | 0.99 | 0.96 | 0.72 |
| Relative $CO_2$ Emissions Total basis | 1.00 | 0.99 | 3.73 | 3.44 |

Example 4 illustrates the combustion system being shutdown for prolonged maintenance. Air is used to purge the combustion system of combustion gases as well as to cool the internal components of the combustion system. The air is introduced via ductwork in the recycle loop that allows for the introduction of air without the recirculation of flue gas to the combustion system. In this manner, we assume the fan has the same capacity as the recycle fan in Examples 1 through 3. The mole fraction of $CO_2$ in the flue gas is assumed to be at steady state with the incoming combustion gases and the combustion system air inleakage, about 65% as shown in Table 5. The lbmoles of $CO_2$ was calculated using the standard volumes adjusted for both temperature and pressure of the system. A temperature of 1700° F. and a pressure of 3 inWC was assumed for purposes of the standard volume calculation. The total number of lbmoles of $CO_2$ in the system is 589.5 under the stated conditions, see Table 5.

Figure 10:
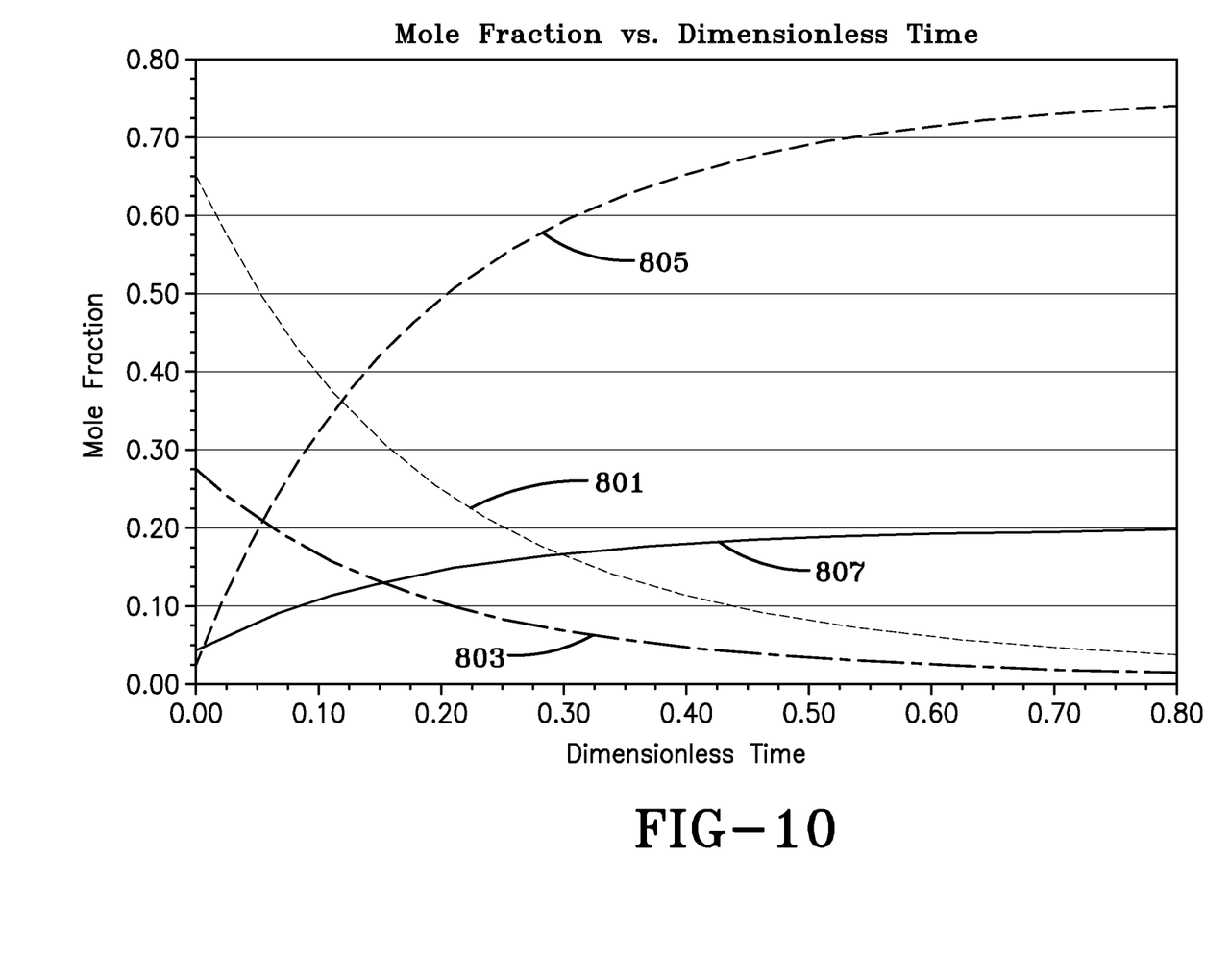
FIG. 10 graphically illustrates the relationship between level of $CO_2$ in the flue gas and time according to an exemplary embodiment of the disclosure.

FIG. 10 shows the change in flue gas composition with time. A rapid decrease in the level of $CO_2$ is contrasted by the subsequent rise of nitrogen and oxygen. Utilizing the same criterion as in the previous example, the $CO_2$ level dips below 0.50 at a dimensionless time of 0.053. The $CO_2$ emitted can be calculated by taking the total number of lbmoles of $CO_2$ in the boiler at the start of shutdown and subtracting the quantity of $CO_2$ captured prior to the mole fraction of $CO_2$ in the flue gas dropping below 0.50. Table 5 summarizes the results of the calculation of $CO_2$ emitted for Examples 4 and 5. A total of 173.0 lbmoles of $CO_2$ is emitted in this example, 29.6%. This percentage was used to normalize the $CO_2$ emissions on an efficiency basis, shown in Table 5. Carbon dioxide emissions were also normalized on a lbmole basis as documented in the last row of Table 5. The efficiency basis is a measure of the effectiveness of capture of a given amount of $CO_2$ present while the total based relative $CO_2$ emissions are the total $CO_2$ emissions for the methods of Examples 4-7 normalized by the total $CO_2$ emissions of Example 4. Example 4 is used as the baseline in which Examples 5-7 are compared against.

Figure 11:
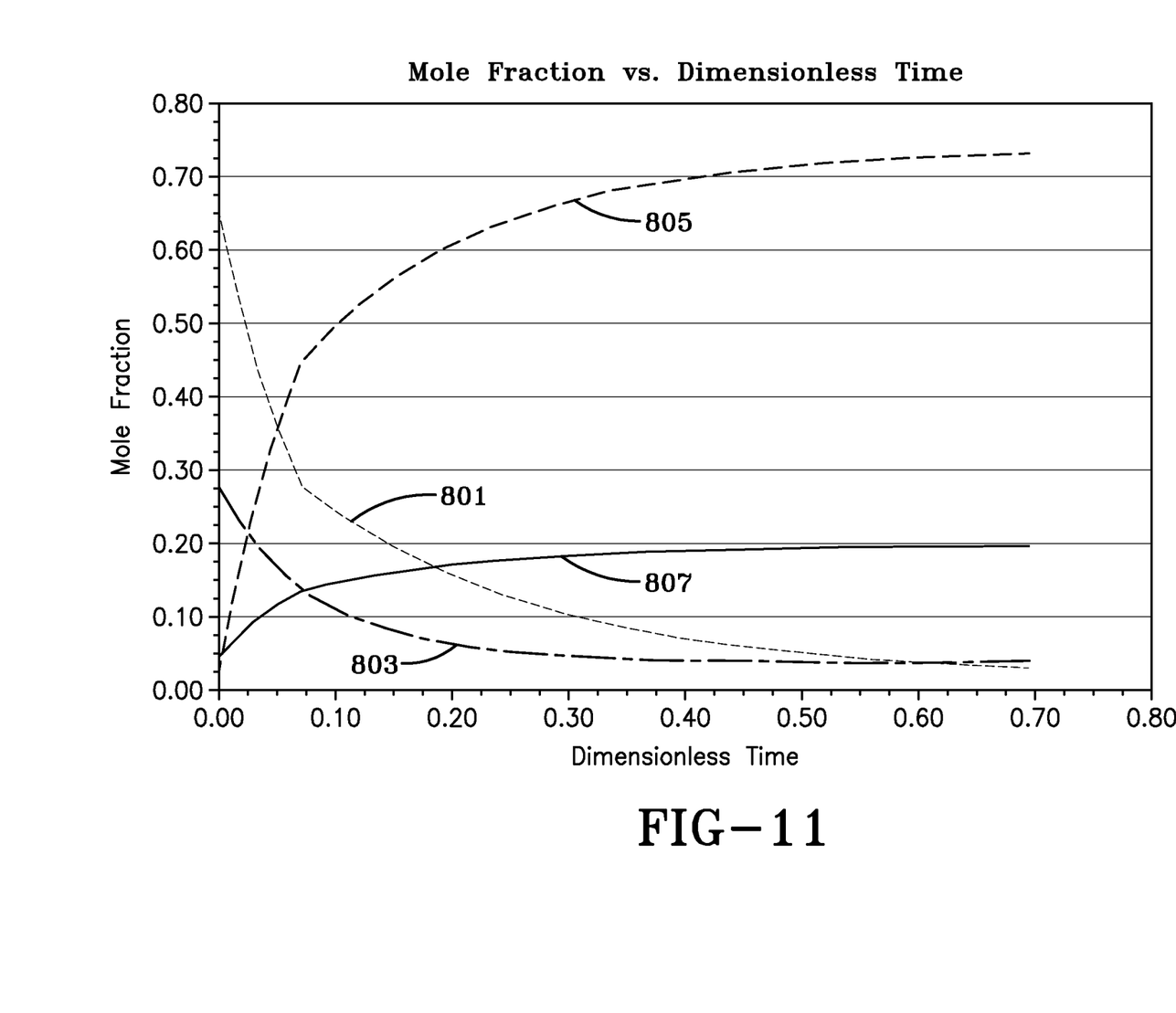
FIG. 11 graphically illustrates the relationship between level of $CO_2$ in the flue gas and time according to an exemplary embodiment of the disclosure.

Example 4 showed the response to cooling the system down with air with no recycle. Example 5 highlights the effect of recycling flue gas while still purging the system with air. In order to accomplish this task, air is supplied via a separate fan of equal capacity to the recycle fan. Thus, the volumetric flow of the incoming purge air is equal to the volumetric flow of the recycled flue gas. The initial composition of the flue gas is assumed to be identical to Example 4, 65% $CO_2$. The response of the system utilizing this recycle methodology is shown in FIG. 11. The rapid decrease is again seen in $CO_2$ while nitrogen and oxygen curves show a complimentary trend. The level of $CO_2$, as compared to Example 4, degrades faster, 0.022 dimensionless time units. Although the change in level $CO_2$ of is faster, the overall capture efficiency is slightly higher than Example 4, relative $CO_2$ emissions of 0.991 compared to 1.000. Since the initial lbmoles of $CO_2$ are the same for Examples 4 and 5, the efficiency and lbmole based relative emissions are identical. The preference for the method in Example 5 over Example 4 is slight. However, the effect of the recycle could be enhanced by reducing the flow of purge air, further increasing the effectiveness of the $CO_2$ capture, on both efficiency and lbmoles basis.

In Example 6, the boiler is cooled by recycling flue gas without the introduction of external air supply. To make up for flue gas taken to the capture system, a secondary recycle is used downstream of the first to provide the additional flow necessary for cooling the system. For example, this recycle stream may originate from an operating utility boiler present at the same site. The composition of the secondary recycle is similar to that of the primary recycle and thus the level of $CO_2$ within the system is maintained at a similar value as examples 4 and 5. Once the system is cooled to 100° F., the primary and secondary recycles are stopped and the boiler is purged with air as described in example 4. Since the boiler is now cool, the mass of gas contained within the boiler has increased in proportion. Ideal gas behavior is assumed in calculating the increase in moles of gas due to the reduced temperature environment and is tabulated in Table 5 for examples 4-7. The moles of $CO_2$ increased substantially between Example 6 and Examples 4 and 5. Also, the incoming actual flow of gas is smaller due to the lower temperature reducing the mixing in the system and increasing the relative effectiveness of capturing the $CO_2$. The percentage of $CO_2$ captured increases in example 6, but the overall emissions are greater. The relative efficiency of the method in Example 6 is 0.96, while the relative lbmoles of $CO_2$ emitted is in excess of 3.5 times the emissions of Examples 4 and 5. Thus, the method used in Example 6 is less preferable than the preceding examples.

Example 6 results indicate the lack of benefit when the system is first cooled with recycled gases where both the primary and secondary recycle streams are of similar composition. Example 7 likewise contains primary and secondary recycles streams with the secondary recycle positioned downstream of the first recycle. The composition of the secondary recycle, however, is significantly different from the primary, e.g. has had one or more additional processing step to increase the purity of $CO_2$, e.g. previously captured $CO_2$. The stream for Example 7 has had a significant amount of water removed from the original stream and has been compressed and cooled. The compressed and cooled gas is then returned, via separate piping, back to the recycled ductwork for reinjection. The level of $CO_2$ in the boiler is increased by recycling this higher purity stream while the boiler is cooling. At the time when the final air purge is started, the mole fraction of $CO_2$ in the flue gas is 80%, noted in Table 5.

A proportional increase in gas mass is seen at the cooler temperatures of Example 7 when compared to Examples 4 and 5 and is equal to that of Example 6, see Table 5. As seen in Example 6, the lower temperatures reduce the actual flow rate of gas and therefore increase the percentage of $CO_2$ captured at shutdown, 0.72 on a relative efficiency basis. The higher initial level of $CO_2$ also increases the percentage of $CO_2$ captured. These benefits clearly make the method of Example 7 better than the method in Example 6 as total lbmoles of $CO_2$ are lower, Table 5. However, the total lbmoles of $CO_2$ are still substantially higher than those of Examples 4 and 5, 3.44 times as much $CO_2$ emitted, and therefore are less preferable to the methods described in Examples 4 and 5.

Examples 4 through 7 outline four different procedures for which an oxy-fuel fired boiler may be shut down. The effect of each method on the relative efficiency and overall quantity of $CO_2$ captured is represented in Table 5. The methods introduced in Examples 5, 6, and 7 show an increase in the percentage of $CO_2$ captured, otherwise efficiency increases. However, the total $CO_2$ emitted is clearly in favor of the methods described in Examples 4 and 5. This is due to the total amount of $CO_2$ in the system being less than that present at the cooler temperatures of Examples 6 and 7. The fact that the methods used in Examples 4 and 5 are not as efficient as those in Examples 6 and 7 is outweighed by the increase in total lbmoles of $CO_2$ in the system. Thus, purging at higher temperatures is preferable than lower temperature. Occasionally, nitrogen may be used if a supply is readily available. Oxy-fuel based firing of a combustion system offers additional methods in which the system can be shut down with the additional constraint of $CO_2$ capture from the flue gas during shutdown. Purging the system with air while still hot offers an advantage to the total emissions released during shutdown. In addition, operating with recycle provides a smaller, but definite advantage to effectiveness of capturing $CO_2$ from the flue gas.

The effect of recycle is greater when the purge flow of air is below that of the recycle flue gas stream. The reduction in the air flow, by the conservation equations, reduces the flow rate of flue gas to the $CO_2$ compression and purification unit. This in turn reduces the effect of dilution due to the incoming air stream while increasing the build up of impurities, e.g. components of air like nitrogen and oxygen, in the recycle stream. The overall effect is to increase the overall effectiveness of capturing the $CO_2$ in the system. Thus, it is preferred to recycle gas while purging the system with air. However, Examples 6 and 7 show there is a limit to the amount of flue gas that can be recycled before a secondary recycle stream is needed. At this point, the boiler is cooled sufficiently by the introduction of two stages of recycle. At the lower temperature in these examples, the total lbmoles of $CO_2$ emitted is much greater. Thus, it is preferred that a quantity of air greater than zero, but less than the recycle stream flow rate is used to cool and purge the system.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method of operating an oxy/fuel combustion system during startup to enable enhanced CO2 recovery, comprising:
    providing a combustion system comprising:
        a furnace having a first burner group including at least one burner arranged and disposed to combust a fuel to form a combustion fluid;
        a convective section arranged to receive the combustion fluid from the furnace; and
        one or more heat exchangers in the convective section arranged and disposed to transfer heat from the combustion fluid to produce and/or superheat steam;
    initiating circulation of a support gas in the combustion system prior to activating the first burner group;
    activating the first burner group while continuing circulation of the support gas, to produce a combustion fluid including CO2, such that a level of the CO2 in the combustion fluid increases as a function of time; and
    continuing production of the combustion fluid to exceed a predetermined level of CO2 in the combustion fluid, for a period of time, the predetermined level being sufficient to permit the CO2 to be purified by a CO2 purification unit.

2. The method of claim 1, wherein the support gas is selected from the group consisting of the initial charge of air in the system, recycled flue gas, an externally supplied primer fluid, and combinations thereof.

3. The method of claim 1, wherein the support gas includes a primer fluid selected from the group consisting of: substantially pure oxygen, substantially pure CO2, and combinations thereof.

4. The method of claim 1, further comprising purifying the CO2.

5. The method of claim 1, wherein the combustion system further comprises the CO2 purification unit.

6. The method of claim 1, further comprising activating a second burner group subsequent to activating the first burner group.

7. An oxy/fuel system for achieving enhanced CO2 recovery during startup, comprising:
    a furnace having a first burner group including at least one burner arranged and disposed to combust a fuel to form a combustion fluid;
    a convective section arranged to receive the combustion fluid from the furnace;
    one or more heat exchangers in the convective section arranged and disposed to transfer heat from the combustion fluid to produce and/or superheat steam; and
    a CO2 purification unit arranged and disposed to purify CO2 above a predetermined level of the CO2;
    wherein the furnace is arranged to circulate a primer fluid prior to activating the first burner group, the primer fluid being selected from the group consisting of substantially pure O2, substantially pure CO2, and combinations thereof,
    wherein the combustion fluid includes CO2, wherein the level of CO2 increases as a function of time to above the predetermined level, and remains above the predetermined level for a period of time.

8. The system of claim 7, further comprising a second burner group arranged and disposed to be activated subsequent to the first burner group being activated.

9. A method of operating an oxy/fuel combustion system during shutdown to enable enhanced CO2 recovery, comprising:
    providing an oxy/fuel combustion system comprising:
        a furnace having a first burner group including at least one burner arranged and disposed to combust a fuel to form a combustion fluid;
        a convective section arranged to receive the combustion fluid from the furnace; and
        one or more heat exchangers in the convective section arranged and disposed to transfer heat from the combustion fluid to produce and/or superheat steam;
    deactivating the first burner group, thereby causing a level of CO2 in the combustion fluid to decrease as a function of time; and
    circulating a primer fluid in the combustion system subsequent to deactivating the first burner group to maintain the level of CO2 in the combustion fluid above a predetermined level of CO2, for a period of time, the predetermined level being sufficient to permit the CO2 to be purified by a CO2 purification unit.

10. The method of claim 9, wherein the primer fluid is selected from the group consisting of substantially pure oxygen, substantially pure CO2, and combinations thereof.

11. The method of claim 9, further comprising purifying the CO2.

12. The method of claim 9, wherein the combustion system further comprises the CO2 purification unit.

13. The method of claim 9, further comprising deactivating the first burner group subsequent to circulating the primer fluid.

14. The method of claim 13, wherein the furnace further comprises a second burner group including at least one burner; further comprising deactivating a second burner group subsequent to deactivating the first burner group.

15. The method of claim 9, further comprising activating at least one igniter subsequent to deactivating the first burner group.

16. The method of claim 9, further comprising purging with air while the system is above ambient temperature.

17. The method of claim 16, further comprising recycling primary flue gas and reducing the amount of air purging the system.

18. The method of claim 16, wherein the purging with air in comparison to the recycling of primary flue gas has a ratio above 0 but no more than about 1.

* * * * *